United States Patent
Soni et al.

(10) Patent No.: US 7,733,764 B2
(45) Date of Patent: Jun. 8, 2010

(54) METHOD AND SYSTEM FOR DYNAMICALLY REDUCING LENGTH OF A DELAY CHAIN

(75) Inventors: Maneesh Soni, Richardson, TX (US);
Kanu Chadha, Acton, MA (US);
Manish Bhardwaj, Cambridge, MA (US)

(73) Assignee: Edgewater Computer Systems, Inc., Ottawa, Ontario (CA)

( * ) Notice: Subject to any disclaimer, the term of this patent is extended or adjusted under 35 U.S.C. 154(b) by 796 days.

(21) Appl. No.: 10/731,730

(22) Filed: Dec. 9, 2003

(65) Prior Publication Data

US 2004/0174810 A1    Sep. 9, 2004

Related U.S. Application Data

(60) Provisional application No. 60/432,698, filed on Dec. 11, 2002.

(51) Int. Cl.
*H04J 11/00* (2006.01)

(52) U.S. Cl. ............... 370/206; 375/354; 375/362; 370/338; 327/149; 327/158; 365/194; 365/239

(58) Field of Classification Search ............... 375/355; 370/206, 338
See application file for complete search history.

(56) References Cited

U.S. PATENT DOCUMENTS 4,368,434 A * 1/1983 Miller et al. ............ 329/336
5,818,769 A * 10/1998 Tweed et al. ............ 365/194
5,946,344 A * 8/1999 Warren et al. ............ 375/150
6,765,419 B2 * 7/2004 Alexander ............... 327/158

FOREIGN PATENT DOCUMENTS

EP    0980186 A2 *    2/2000

* cited by examiner

*Primary Examiner*—David C Payne
*Assistant Examiner*—Leon Flores
(74) *Attorney, Agent, or Firm*—Hamilton, Brook, Smith & Reynolds, P.C.

(57) ABSTRACT

Upon a triggering event, a delay chain shifts data out at a higher rate than incoming packets and a processor controls bypassing circuitry to reduce the latency of hardware implementations of, for example, 802.11a OFDM receivers, with long delay chains. The signal processing algorithms used to recover symbol timing need a large number of samples stored in a delay chain, often consisting of pipelined registers. Such a delay chain introduces a large lag between the time samples have been acquired by the data converters and the time they are processed. This delay makes it difficult for higher level network layer implementations to meet the deadlines of 802.11a WLAN protocol. The proposed scheme implements dynamic reduction in the depth of the delay chain once timing recovery has been performed. A multi-step scheme achieves exponential reduction in the number of elements in the delay chain in every step.

8 Claims, 6 Drawing Sheets

| | Clock Cycle | Valid Signal (Incoming Sample at Delay Chain Input) | \multicolumn{18}{c|}{REGISTERS} |

| Mode | Clock Cycle | Valid Signal (Incoming Sample at Delay Chain Input) | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|---|
| SLOW mode | 1 |   | + |   |   |   |   |   |   |   |   |   |   |   |   |   |   |   |   |   |
|  | 2 | + | + | + |   |   |   |   |   |   |   |   |   |   |   |   |   |   |   |   |
|  | 3 |   | + | + | + |   |   |   |   |   |   |   |   |   |   |   |   |   |   |   |
|  | 4 |   |   | + | + | + |   |   |   |   |   |   |   |   |   |   |   |   |   |   |
|  | 5 | + |   |   | + | + | + |   |   |   |   |   |   |   |   |   |   |   |   |   |
|  | 6 |   | + |   |   | + | + | + |   |   |   |   |   |   |   |   |   |   |   |   |
|  | 7 |   | + |   |   |   | + | + | + |   |   |   |   |   |   |   |   |   |   |   |
|  | 8 |   | + |   |   |   |   | + | + | + |   |   |   |   |   |   |   |   |   |   |
|  | 9 |   | + |   |   |   |   |   | + | + | + |   |   |   |   |   |   |   |   |   |
| FAST mode | 10 | + | + |   |   |   |   |   |   | + | + | + |   |   |   |   |   |   |   |   |
|  | 11 |   | + | + |   |   |   |   |   |   | + | + | + |   |   |   |   |   |   |   |
|  | 12 |   | + | + | + |   |   |   |   |   |   | + | + | + |   |   |   |   |   |   |
|  | 13 |   | + | + | + |   |   |   |   |   |   |   | + | + | + |   |   |   |   |   |
|  | 14 | + | + | + | + |   |   |   |   |   |   |   |   | + | + | + |   |   |   |   |
|  | 15 |   | + | + | + | + |   |   |   |   |   |   |   |   | + | + | + |   |   |   |
|  | 16 |   | + | + | + | + |   |   |   |   |   |   |   |   |   | + | + | + |   |   |
|  | 17 |   | + | + | + | + |   |   |   |   |   |   |   |   |   |   | + | + | + |   |
|  | 18 | + | + | + | + | + |   |   |   |   |   |   |   |   |   |   |   | + | + | + |
|  | 19 |   | + | + | + | + |   |   |   |   |   |   |   |   |   |   |   |   | + | + |
|  | 20 |   | + | + | + | + |   |   |   |   |   |   |   |   |   |   |   |   |   | + |

FIG. 5

FIG. 6

METHOD AND SYSTEM FOR DYNAMICALLY REDUCING LENGTH OF A DELAY CHAIN

RELATED APPLICATION

This application claims the benefit of U.S. Provisional Application No. 60/432,698, filed Dec. 11, 2002. The entire teachings of the above application is incorporated herein by reference.

BACKGROUND OF THE INVENTION

The IEEE standard 802.11a pertains to wireless local area networks (WLAN), and adopts Orthogonal Frequency Division Multiplexing (OFDM). OFDM is a technology that transmits data as multiple signals simultaneously over a single transmission path. OFDM spreads the data over a large number of carriers that are spaced apart at precise frequencies. Typically, a transmitter transforms frequency based data into the time-domain using an Inverse Fast Fourier Transform (IFFT) algorithm prior to transmission. A receiver then transforms a received packet back to the frequency domain using a Fast Fourier Transform (FFT) algorithm. The total number of sub-carriers translates into the number of points of the IFFT/FFT. In a wireless networking environment, OFDM has inherent advantages over a signal carrier system in a frequency-selective fading channel, such as high spectral efficiency, resiliency to RF interference, and lower multi-path distortion.

Under 802.11a, packets are mapped into a framing format suitable for sending and receiving user data and management information between two or more stations. This format includes a preamble field that is comprised of a preamble of short symbols (short preamble) and a preamble of long symbols (long preamble). Subsequent to the preambles is a signal field, followed by multiple data fields. At a receiver, incoming packets are sampled, and the samples are entered into a delay chain or delay line for processing to locate the field boundaries.

A standard 802.11a timing recovery algorithm uses a long delay chain, typically comprised of a plurality of pipelined registers, to store a large number of data samples. In general, a register pipeline can be useful for applications in digital signal processing and wireless telecommunications systems. With respect to timing acquisition of a 802.11a packet, samples are often tapped from registers in the delay chain for use in computations.

SUMMARY OF THE INVENTION

After a receiver has synchronized to an incoming packet symbol boundary, packet samples are no longer necessary for synchronization processing. In a typical receiver, the incoming samples still go through a delay chain and add to the latency of the data-path. The latency can be critical when considering the need for a receiver to process a data packet and send an acknowledgment within a small window of time. For example, the deadlines of 802.11a WLAN protocol require an acknowledgment 16 μs after the processing of a packet. If the receiver fails to respond quickly, time is lost between a packet and its acknowledgment. As a few microseconds are lost for each packet, and hundreds of packets may be sent every second, such a delay may adversely affect the overall system performance and throughput.

In the present invention, the delay chain is modified such that the samples are sent through the full length of the delay chain only when timing acquisition is in progress. At the end of timing acquisition, the samples already inside the delay chain are shifted out at a rate higher than the rate of incoming samples by using logic circuits to control the registers of the delay chain. Additional logic is used to control register bypassing in order to dynamically reduce the length of the delay chain as samples are shifted out. Depending on the rate of shifting out of these samples, the delay chain can be completely emptied after some time. This reduces the delay caused by timing acquisition algorithms to almost zero.

Thus, in accordance with the present invention, samples are read into a tapped delay chain and processed. Subsequent to an event, the samples are rapidly shifted from the delay chain at a higher rate than the samples coming in, allowing for the reduction in the delay chain length. In one embodiment of the present invention, the delay chain is comprised of a plurality of pipelined registers used for timing synchronization of data packets conforming to the IEEE 802.11a standard at a receiver. Shifting can be done in a number of phases to provide a scalable reduction of length in the delay chain.

Though described with regard to the use of pipelined registers for the timing synchronization of 802.11a packets, the present invention can also be applied to other transmission systems such as 802.11g and High Performance Radio LAN/2 (HIPERLAN/2), and in other scenarios where dynamically reducing the length of a pipeline of registers would be beneficial.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
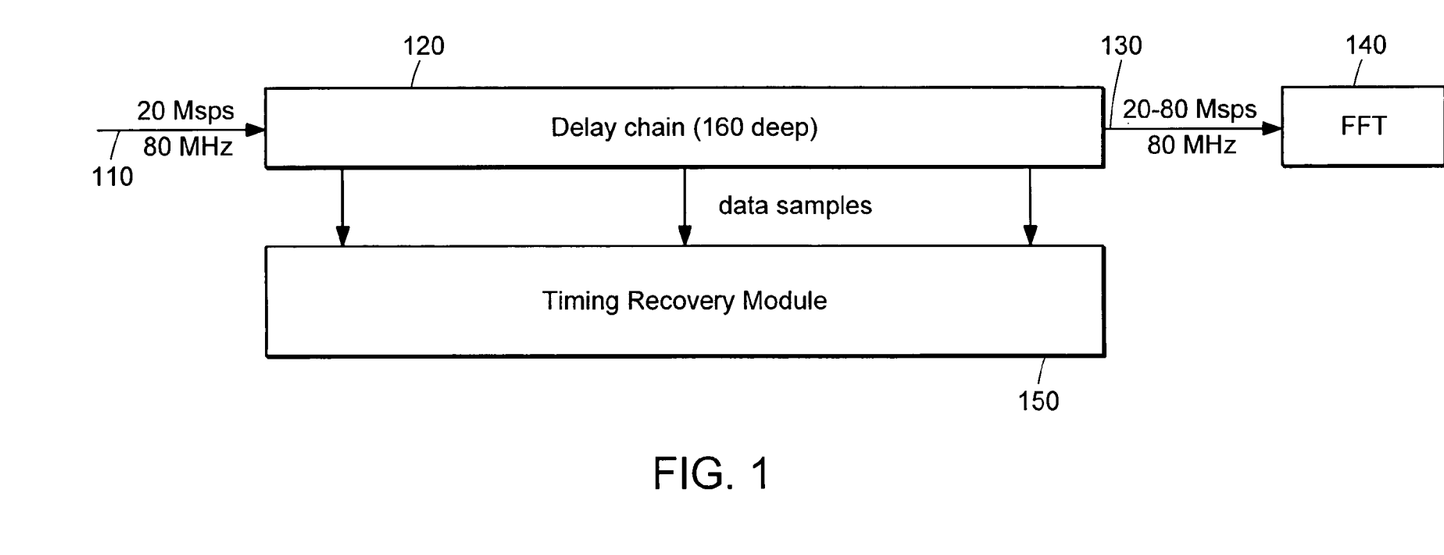
FIG. 1 is a diagram illustrating a timing acquisition system in a receiver.

As shown in FIG. 1, the delay chain (120) receives an incoming stream (110) of data samples at one fourth the clock rate. The output stream (130) is processed by the FFT module block (140) which can take data samples as fast as the clock rate, provided its buffers are not overrun. A timing recovery module (150) taps registers in the delay chain for timing recovery processing. An example of such a process is presented in a patent application Ser. No. 10/712,800, titled "Method and System for Fast Timing Recovery for Preamble Based Transmissions" filed on Nov. 13, 2003, which is incorporated herein by reference in its entirety. When timing recovery is in progress, the delay chain operates at 20 mega samples per second (Msps) and no samples are sent to the FFT. Once timing recovery is done, the samples flow through the delay chain to the FFT.

In a typical implementation with a 160 register pipeline and input rate of 20 Msps, all samples input to the delay chain will undergo a delay of 8 µs. However, in an implementation in accordance with one embodiment of the present invention, the delay chain is designed to work at two rates, 20 Msps and 80 Msps. The higher rate of operation is activated only after the timing recovery is complete and the timing recovery module is no longer being used. Using the two different rates, along with register bypassing hardware, reduces the delay that the remainder of incoming samples undergo.

While the data is moved out of the delay chain at the faster rate, it still arrives into the chain at the slower rate. The design of the delay chain is such that the incoming samples are still stored in contiguous registers at the input end of the delay chain so that no empty gaps are created in between registers containing valid data. Therefore, registers at the input side of the delay chain must not shift at every clock cycle, but instead must wait until new data arrives into the chain. This allows a gap comprising of a series of empty registers to form between data leaving at a fast rate and new data coming into the delay chain. Once the valid data at the output end has emptied, the empty registers can then be bypassed, and the length of the delay chain can be reduced.

Figure 2:
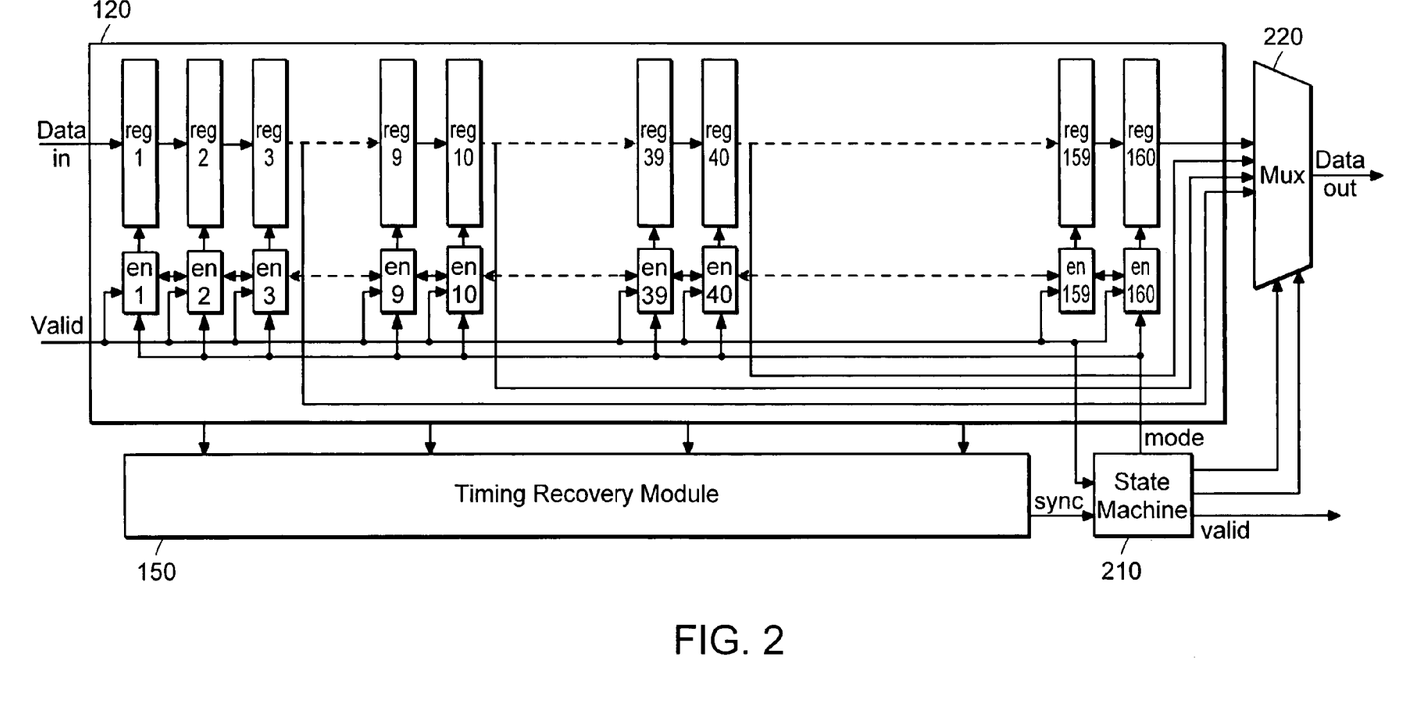
FIG. 2 is a circuit diagram illustrating the delay chain architecture of an embodiment of the present invention.

The design of the delay chain is illustrated in FIG. 2. As shown, the delay chain comprises 160 pipelined registers (en1-en160) with the output of one register entering the next one. Since the clock rate and data rate are not the same, incoming and outgoing samples need to be qualified with a 'valid' signal. Each register has an enable logic (reg1-reg160) that decides whether or not the register should be loaded with a new value. This logic is determined by the incoming valid signal and the SLOW/FAST mode in which the samples are being shifted out.

When the timing recovery is in progress, the samples in the delay chain are shifted once on each valid signal pulse which happens every four cycles. In approximately 8 µs (the duration of short preambles in an 802.11a packet), timing recovery is complete and the 'sync' signal is asserted to initiate the delay chain reduction. At this time, the state machine (210) switches the shifting operation to FAST mode and also controls the multiplexer at the end of the delay chain.

Figure 3:
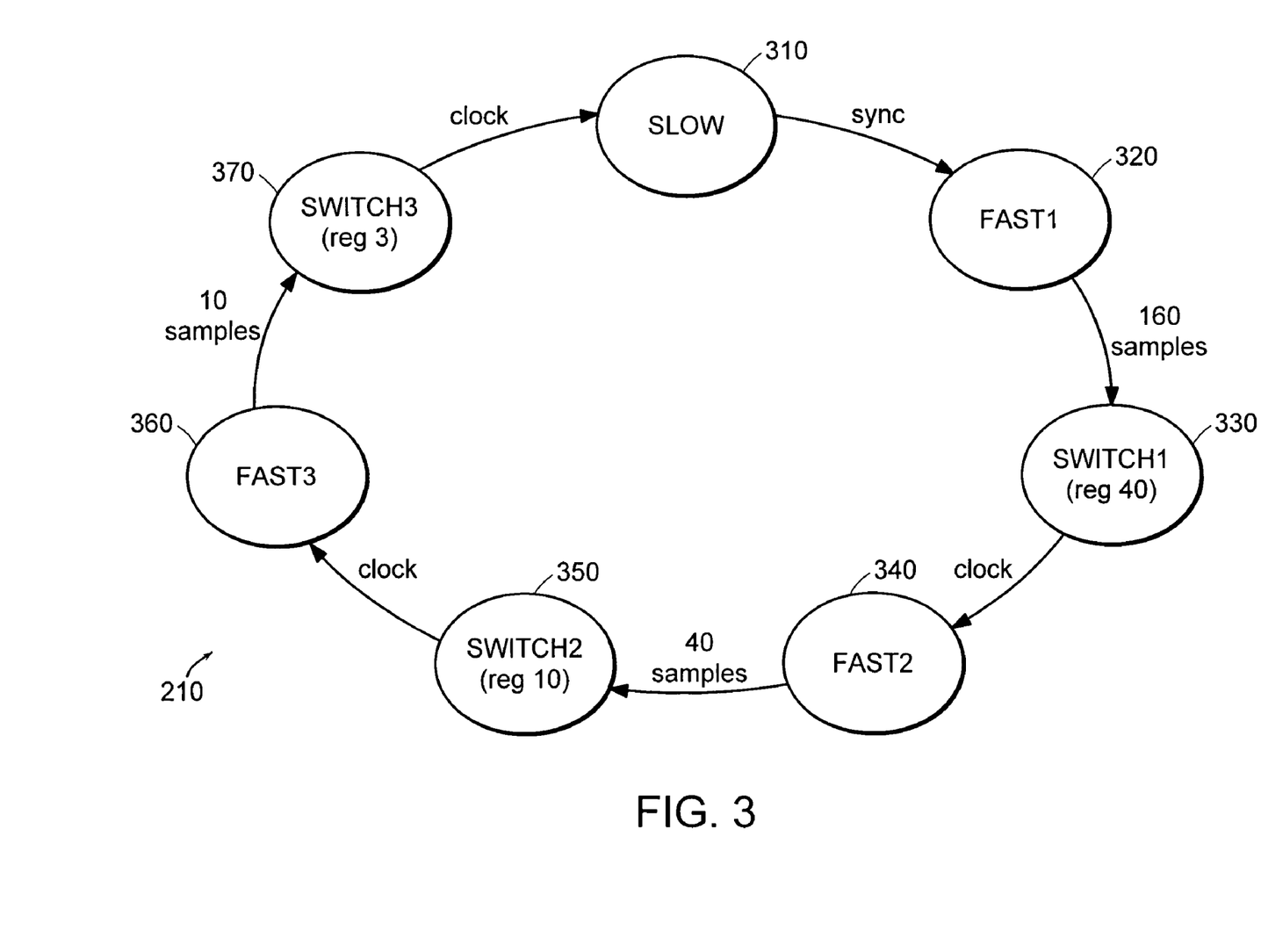
FIG. 3 is a state diagram illustrating the states of the delay chain.

In a preferred embodiment of the present invention, as illustrated in FIG. 3, the state machine (210) handles the length reduction of the delay chain in three phases—from 160 registers to 40, from 40 to 10 and from 10 to 3. Initially, the delay chain begins with all 160 registers containing a sample (310). At the start of the 'sync' command, the dynamic reduction in delay chain begins.

In FAST mode (320), the data samples are shifted out of the delay chain to the FFT module at every clock cycle. At the same time, there are more samples coming in at the input of the delay chain at the slow rate of once every four clock cycles. In the time 160 samples are shifted out, there are 40 new samples received and held at the input end of the delay chain. Once the first 160 samples are shifted out, the multiplexer is switched to the 40$^{th}$ register output (330). As shown in FIG. 2, samples are then bypassed from the 40$^{th}$ register directly to the output of the multiplexer. This completes the first phase of latency reduction. After switching, the same process of fast shifting of samples is used for the remaining 40 samples (340). Once these samples are shifted out, the multiplexer is switched to the 10$^{th}$ register output (350). Now, the length of the delay chain is only 10 elements. As can be seen in FIG. 3, the process is repeated once more with the fast shifting resuming (360) to drop the delay chain length to 3 elements (370). Once the system determines it needs to perform another timing recovery, the delay chain switches back into its initial state (310) and allows the entire length of the delay chain to fill. This completes the latency reduction process for the 802.11a packet that is being processed currently.

The samples that arrive after the latency reduction process pass through only 3 elements of the delay chain which amount to only 0.15 µs of delay. Within the scope of the present invention, one skilled in the art can vary the length of the delay chain, the number of phases in the dynamic reduction process, and the length of the individual phases depending on system requirements, and hardware limitations.

During the fast shifting phases, it is necessary that the registers at the input side of the delay chain do not shift at every clock cycle once the data samples have been fast shifted out to the next registers. By keeping all incoming samples in consecutive registers, rather than allowing them to move along the delay chain faster than they arrive, the present invention allows the delay chain's state machine to bypass empty registers without discarding any samples. The enable logic associated with each register makes this possible by making the decision whether or not to enable the shifting in of a data sample to the register.

Figure 4:
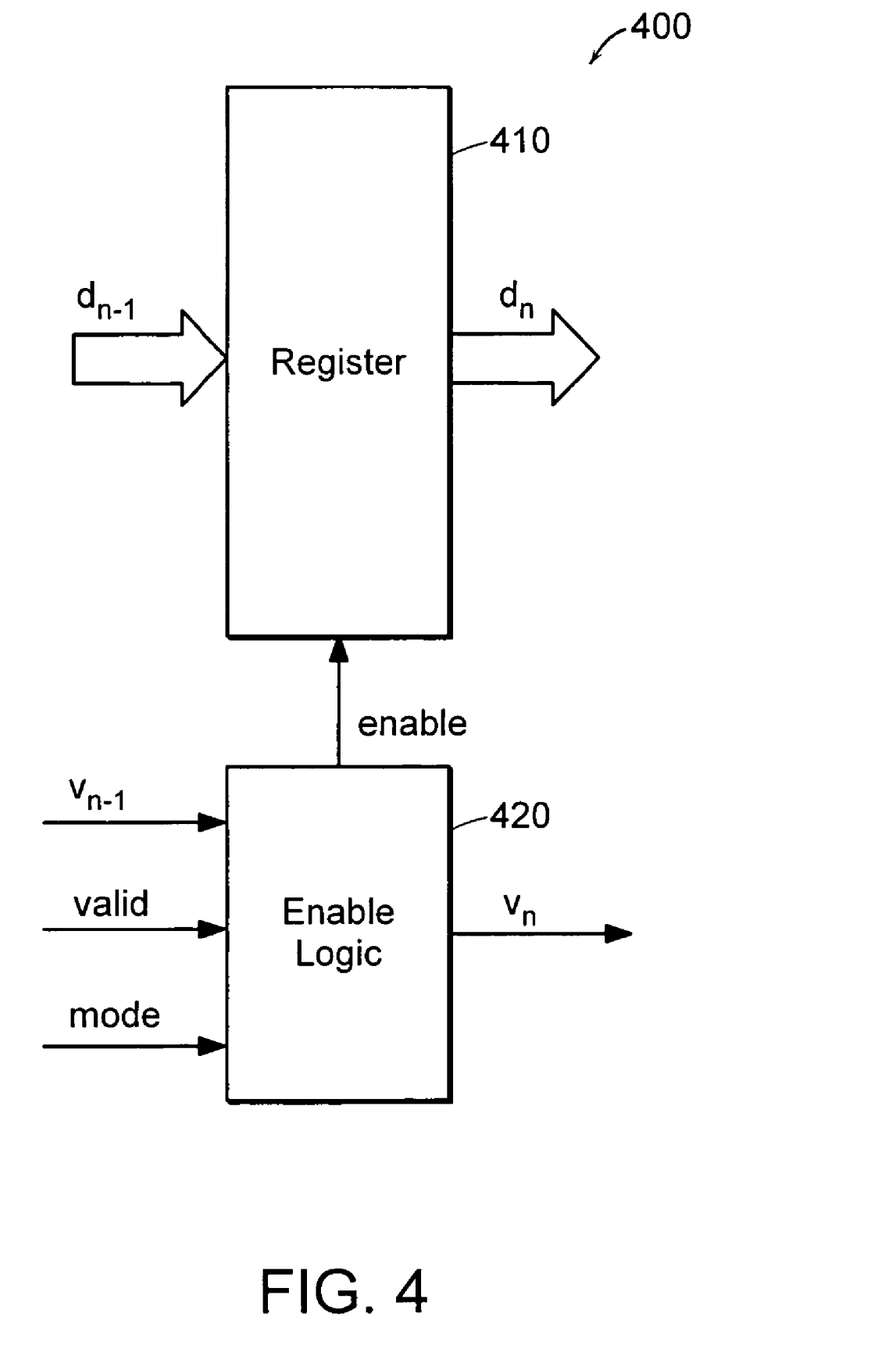
FIG. 4 is a diagram of a single delay element of a delay chain.

A single delay element (400) of a delay chain that may be used in one embodiment of the invention is illustrated in FIG. 4. The delay element (400) may include both a register (410) to store the data, and an enable circuitry (420) to determine when the input from the previous register should be latched.

In FIG. 4, $d_{n-1}$ is the output data from the previous register, and $d_n$ is the output data of the current register (410). An enable signal from the enable logic controls whether the current register (410) will take on the data from the previous register. In turn, three different signals feed into the enable circuitry (420) to determine the enable signal. As shown in FIG. 4, those signals are: $v_{n-1}$ which indicates whether the previous delay element has valid data; mode which originates from the state machine (210) in FIG. 3 and indicates whether the delay elements in the chain are operating in SLOW mode or in FAST mode, and the valid signal which indicates that there is a new signal coming in. In addition, there is a state variable inside the enable circuitry (420) that is used to track whether the register is either READY or NOT READY, i.e., whether the delay element can continue shifting data at every clock cycle while in FAST mode. Further, each enable circuitry (420) communicates with the enable circuitry ahead of it in the delay chain, informing the next enable circuitry whether it has valid data to transmit.

The enable signal operates in a different manner depending on the mode. The enable circuitry operates in two modes: the SLOW mode (mode=0) and the FAST mode (mode=1). When the enable signal is asserted, $d_n$ gets the value of $d_{n-1}$. The following pseudocode demonstrates how the enable logic operates in SLOW mode (mode=0):

```
state = READY;
if (valid & v_{n-1})
    d_n=d_{n-1};
    v_n=1;
```

In SLOW mode, the enable circuitry of the entire delay chain operates in one state. As a default, the state variable is always set to the READY state. In SLOW mode, the register will take data at the slower rate. As shown in the above pseudocode, the data is shifted whenever there is a new sample coming into the delay chain and there is valid data in the previous element. This happens once every four clock cycles.

The delay element operates differently in FAST mode (mode=1). When the delay chain is in FAST mode, the delay chain uses the state variable in each of the enable circuits to allow the registers to operate in two different states, the READY state or the NOT READY state:

--- case (state)
    READY:
        if ($v_{n-1}$)
            $d_n = d_{n-1}$;
            $v_n = 1$;
        else
            state = NOT_READY;
            $v_n = 0$;
    NOT_READY:
        if (valid & $v_{n-1}$)
            $d_n = d_{n-1}$;
            $v_n = 1$;

---

In the READY state of FAST mode, the data is shifted if the previous element has valid data. Since all elements have valid data when FAST mode is first enabled, the shifting process occurs at every clock cycle and is READY to operate in the FAST mode. However, with each clock cycle, one delay element gets emptied out and does receive valid incoming data. If a delay element does not receive valid data, it sets its state variable to the NOT READY state which means that it will shift more data into its register only when there is new valid data in the previous register and new data arrives at the input of the delay chain (once every four clock cycles).

Figure 5:
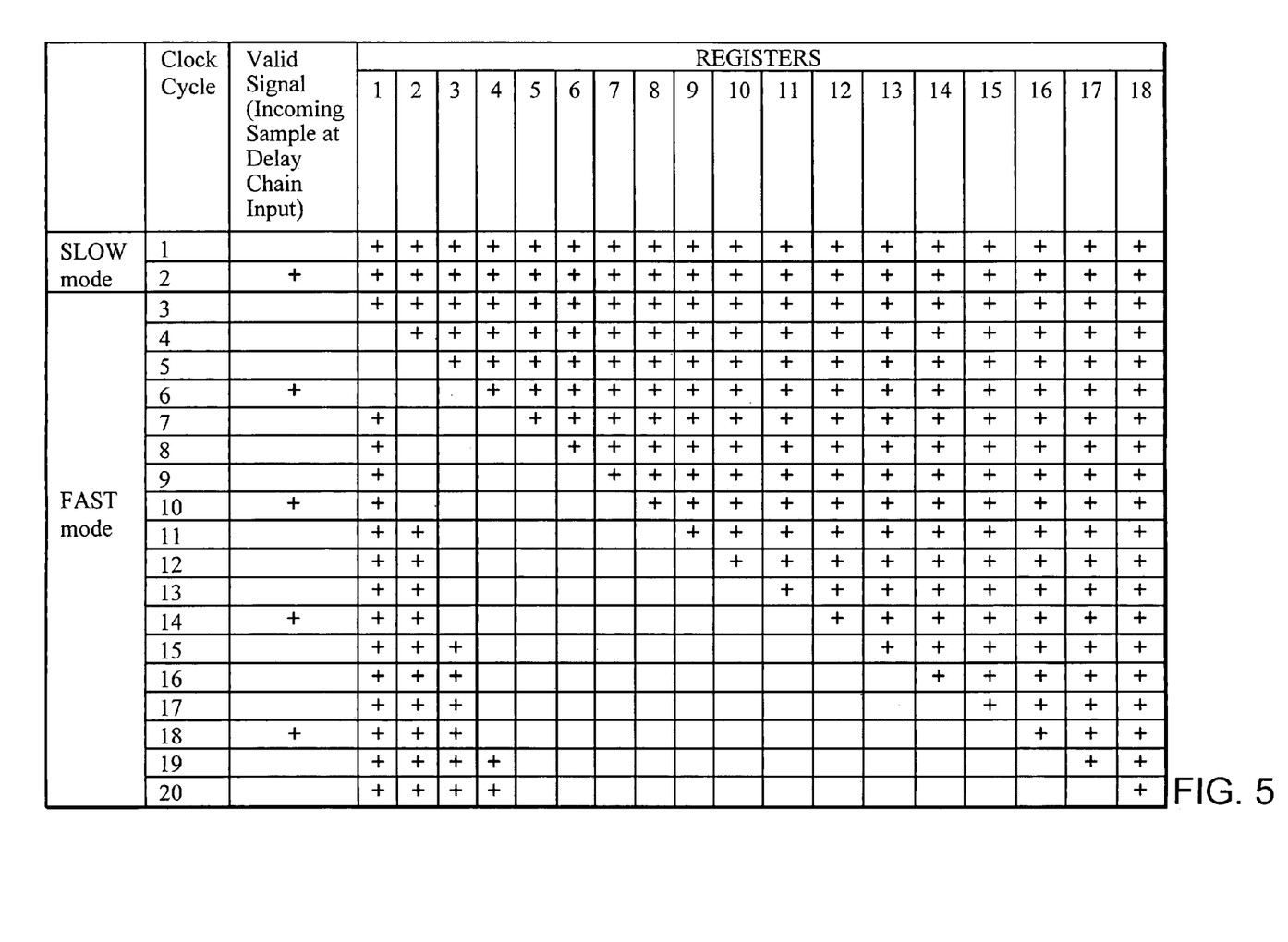
FIG. 5 is a timing diagram illustrating the movement of samples throughout a delay chain in an embodiment of the present invention.
Figure 6:
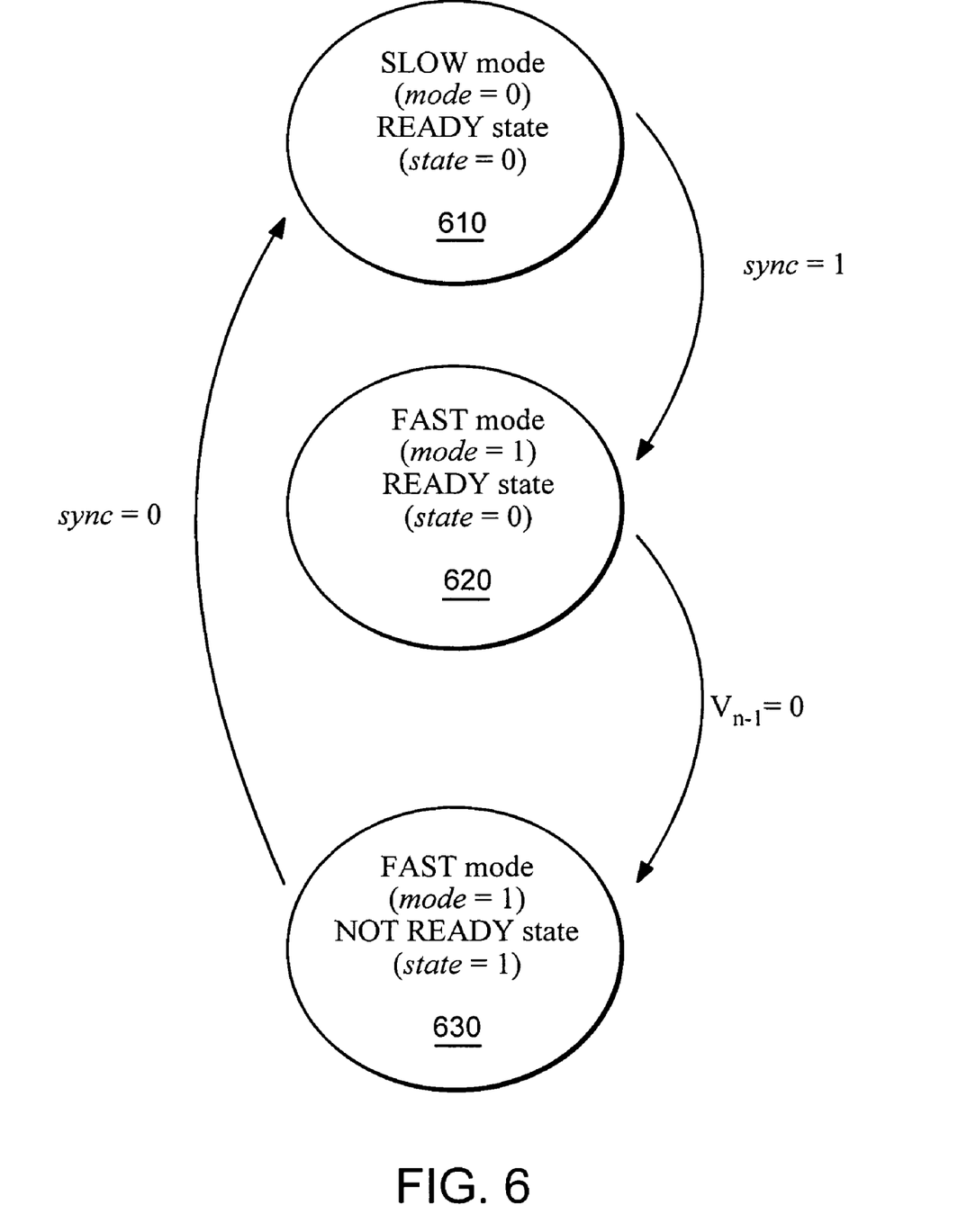
FIG. 6 is a state diagram of the enable circuits of the individual delay chain registers.

FIG. 5 illustrates a timing diagram of how the delay chain operates in the different modes and states during an exemplary interval. FIG. 6 illustrates the states of the enable logic to demonstrate how the output side of the delay chain moves data samples out at a higher rate than movement of data samples at the input side. The enable circuitry has three states: SLOW mode/READY state (610); FAST mode/READY state (620) and FAST mode/NOT READY state (630) to switch between.

At clock cycle 2 of FIG. 5, register 3 is still in SLOW mode, and therefore is also in the READY state (610). In the SLOW mode, the enable circuitry data always remains in the READY state (610), and data is shifted into the register at every valid signal. At clock cycle 2, a valid signal indicates to the enable circuitry of register 3 that a new sample is entering the delay chain. Further, the enable circuitry of register 2 indicates to the enable circuitry of register 3 that register 2 has valid data. Therefore, in clock cycle 3, register 3 will accept the data from register 2.

During clock cycle 2, an event that would call for the dynamic reduction of the delay chain has occurred, such as timing recovery, and a sync signal activates the change in mode at the state machine, and the delay chain switches into FAST mode (mode=1). In clock cycle 3, all the enable circuits of the registers are now operating in FAST mode, however they are still in the default READY state that they were initially in during SLOW mode (620). The enable circuitry of register 3 receives information that register 2 contains valid data and immediately shifts that data into register 3 at the next clock cycle.

At clock cycle 4, the enable circuitry operates the READY state of the FAST mode (620) and receives information that register 2 contains valid information. Therefore, at the next clock cycle, the enable circuitry of register 3 allows the data from register 2 to shift into register 3.

At clock cycle 5, the enable circuitry of register 3 receives information that register 2 does not contain valid data, therefore register 3 does not shift the data of register 2. Instead, at the next clock cycle (clock cycle 6), register 3 will indicate that it no longer has valid data and it will enter the NOT READY state of the FAST mode (630).

At clock cycles 6-10, register 3 is in the NOT READY state of the FAST mode (630) and does not contain valid data. The enable circuitry continues to monitor both incoming data to the delay chain, and the validity of the data in register 2. At clock cycles 11-13, the enable circuitry of register 3 receives information that register 2 has valid information, but since there is no valid signal indicating incoming data at the entry of the delay chain, register 3 does not accept the data of register 2.

At clock cycle 14, the enable circuitry of register 3 receives information that register 2 has valid information and that new data is entering the delay chain. Therefore, at the next clock cycle (clock cycle 15), the enable circuitry of register 3 will allow data to shift from register 2 into register 3. The enable circuitry will remain in the NOT READY state of the FAST mode (630), but will now indicate that register 3 has valid data.

It can be seen that the upper, full registers, i.e. those in the upper right of FIG. 5, shift rapidly every clock cycle, while the lower full registers, i.e. those in the lower left of FIG. 5, shift only once every fourth clock cycles as data is received in the delay chain. As a result, the upper stages of the delay chain empty as incoming data is collected in the lower stages.

Once the delay chain has shifted out all of its valid data at the output end at the fast rate and all the enable circuits in FAST mode have switched into the NOT READY state, a multiplexer taps the delay chain at the last register containing valid data at the input end of the delay chain. In an embodiment of the invention, as the multiplexer switches registers (330) (350) (370), the state machine 210 resets all the enable circuits back into SLOW mode and READY state (610) for one clock cycle. Then in the next clock cycle (340) (360), the enable circuits can be placed into FAST mode and READY state (620) again, to repeat the reduction process.

The enable logic and the state machine are designed to repeat the entire process for every 802.11a packet that comes into the delay chain. In an embodiment of the invention, the delay chain length is reset to 160 to begin timing recovery and then eventually dropped down to 3 after timing recovery is done. The scheme reduces the overall delay in the data path substantially.

A scheme to reduce data path latency by elimination of delay elements from a delay chain is described. The implementation has a very low overhead in terms of hardware requirements and can be used with any arbitrary length delay-chain. The only restriction is that the design modules to which data is sent at the fast pace should be able to handle the data rate.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of reducing data path latency in digitally processing a sequence of data samples, the data path latency being associated with a transient processing operation on the data samples, comprising:

at the transition into the transient processing operation on the data samples reading the sequence of data samples into a tapped clocked delay chain, wherein each data storing element of the chain has an associated enabling signal for controlling, on any given clock cycle, whether to update or not its respective stored data sample;

during the transient processing operation on the data samples, processing data samples from taps on the clocked delay chain;

in response to receiving a signal of completion of the transient processing operation on the data samples, controlling the enabling signal of each data storing element in the chain to allow shifting data samples through an end portion of the clocked delay chain on a selected first set of clock cycles determining a first shifting rate and shifting data samples in an initial portion of the delay chain on a selected second set of clock cycles determining a second shifting rate, wherein the initial portion is complementary to the end portion and wherein the first shifting rate is higher than the second shifting rate; and dynamically reducing the length of the clocked delay chain by moving the output of the delay chain to the last data storing element of the initial portion, after a number of clock cycles.

2. The method of claim 1 wherein the data samples are from a data packet.

3. The method of claim 2 wherein the data packet conforms to a transmission system selected from the group of 802.11a, 802.11g and HIPERLAN/2 transmission systems.

4. The method of claim 3 wherein the transient processing operation includes a synchronization of the data packet.

5. The method of claim 4 wherein the clocked delay chain comprises a plurality of pipelined registers.

6. The method of claim 5 wherein the reducing the length of the clocked delay chain is performed until a desired length of the clocked delay chain is achieved.

7. The method of claim 5 wherein reducing the length of the clocked delay chain further includes bypassing empty registers.

8. A method of reducing data path latency in digitally processing a sequence of data samples of a data packet, the data path latency being associated with synchronization of the data packet, comprising:

upon reception of the data packet, reading the sequence of data samples from the data packet into a tapped clocked delay chain comprising a plurality of pipelined registers, wherein each register has an associated enabling signal for controlling, on any given clock cycle, whether to update or not its respective stored data sample;

processing data samples from taps on the clocked delay chain to synchronize the data packet;

in response to receiving a signal of completion of synchronization of the data packet, controlling the enabling signal of each data storing element in the chain to allow shifting samples through an end portion of the clocked delay chain on a selected first set of clock cycles determining a first shifting rate and shifting data samples in an initial portion of the delay chain on a selected second set of clock cycles determining a second shifting rate, wherein the initial portion is complementary to the end portion and wherein the first shifting rate is higher than the second shifting rate;

reducing the length of the clocked delay chain by moving the output of the delay chain to the last register of the initial portion, after a number of clock cycles; and repeating the steps of shifting data samples through an end portion of the reduced delay chain and through the initial portion and reducing the length of the clocked delay chain.

* * * * *